T. M. GLEASON.
FAUCET COCK.
APPLICATION FILED SEPT. 20, 1915.
1,237,324.
Patented Aug. 21, 1917.
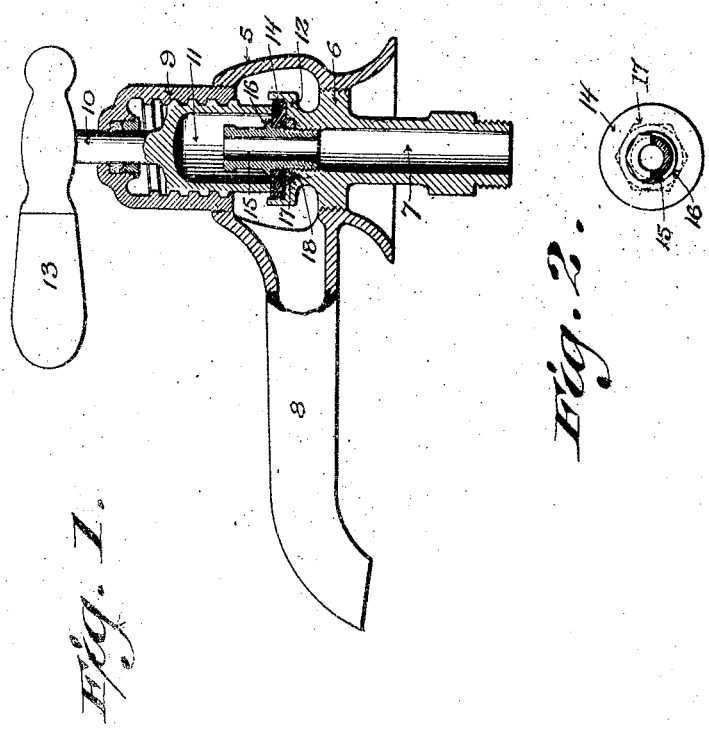

UNITED STATES PATENT OFFICE.

THOMAS M. GLEASON, OF RACINE, WISCONSIN.

FAUCET-COCK.

1,237,324.  Specification of Letters Patent.  Patented Aug. 21, 1917.

Application filed September 20, 1915. Serial No. 51,606.

*To all whom it may concern:*

Be it known that I, THOMAS M. GLEASON, a citizen of the United States, and resident of Racine, in the county of Racine and State of Wisconsin, have invented certain new and useful Improvements in Faucet-Cocks; and I do hereby declare that the following is a full, clear, and exact description thereof.

This invention relates to new and useful improvements in faucet cocks particularly of that type embodied in Patent No. 912,466, granted to me February 16, 1909.

It is an important object of the present invention to improve the structure embodied in this said patent particularly with respect to the matter of assembling the various faucet parts whereby the valve seat washer may be readily removed and replaced should it become worn or broken.

It is more specifically an object to provide an independent detachable washer carrying member to which the washer is attached so that removal of its member will also remove the washer, this member being incorporated with the valve structure in an exceedingly compact manner.

With the above and other objects and advantages in view, the invention resides more particularly in the novel combination, arrangement and formation of parts more particularly hereinafter described and particularly pointed out in the appended claim.

Reference is had to the accompanying drawings wherein similar characters of reference designate corresponding parts throughout the several views and in which:

Figure 1 is a side elevation of the improved faucet cock, with the casing cut away and various parts within the casing shown in section to more clearly disclose the structure.

Fig. 2 is a top plan view of the washer nipple.

Referring now more particularly to the accompanying drawings, 5 designates a valve casing which has its intermediate portion restricted for threaded engagement with a circumscribing collar 6 formed on a threaded pipe portion 7 which extends longitudinally into one end of the casing. A discharge spout 8 leads from the side of the casing between its upper portion and its said restricted portion. Threaded in the opposite end of the casing is a bonnet 9 through which is longitudinally passed a valve stem 10, terminating inwardly in an inverted cup shaped head portion 11, whose mouth edge is disposed in juxtaposition to a cupped valve seat 12 formed on the inner end of the threaded pipe portion 7. The bonnet and valve head portion having relatively coarse threaded engagement so that upon rotation of the head by means of a suitable handle 13 carried at the outer end of the stem, the head may be reciprocated with respect to the said seat.

For holding a washer 14 on the valve seat, in such manner that it may readily be removed, a nipple 15 is provided which is adapted to threadedly engage in the inner end of the bore of the inlet pipe portion 7 and which is intermediately provided with a circumscribing rib 16. A nut 17 is threaded on the threaded end of the nipple to bind the washer 14 between said nut and the rib 16, and this nut seats in a counter-bore 18 of the pipe portion 7. The nipple extends upwardly into the valve head.

Thus it is seen that the entire valve structure may be readily assembled and that it comprises a minimum number of actual parts. By removing the bonnet 9 and the valve head carried thereby, the nipple 15 may be readily unscrewed and removed and in its removal carries the washer 14 with it. As the securement of the washer is between the nut 17 and the rib 16 it is seen that the nipple need not be screwed clampingly into the pipe portion 7 to hold the washer from being loose, as it is held by the nut 17.

The structure of my previous patent embodies a cupped valve head having a flared lower portion to conduce to the provision of an air cushion to prevent water hammer and this flared portion is not shown in the present structure but it will be appreciated that this flared portion may be provided if desired by simply altering the proportion of the bonnet 9 and valve head 11 without in any manner altering any of the novel principles embodied in this application.

Claim:

A faucet cock including a casing, having a restricted intermediate threaded portion, a supply pipe terminating in the casing and having a threaded collar formed thereon near its inner end and in threaded engagement with the restricted portion of the casing, a cupped valve seat formed on the inner end of the supply pipe, a washer seated therein and having a central aperture registering with the opening of said supply pipe, said inner end of the supply pipe being internally threaded, a nipple having a threaded end engaging the internally threaded opening of the supply pipe, a circumscribing rib intermediate the ends of said nipple and serving to adjustably retain the washer in its seat, the free end of said nipple extending into the interior portion of the casing, a bonnet having its inner end in threaded engagement with the casing and being internally threaded, an inverted cup shaped valve head portion having external threads thereon engaging the internal threads of the bonnet, an operating shaft and handle for operating said valve head portion, and an outlet leading from the casing, all substantially as described.

In testimony that I claim the foregoing I have hereunto set my hand at Racine, in the county of Racine and State of Wisconsin, in the presence of two witnesses.

THOMAS M. GLEASON.

Witnesses:
JOHN H. LIEGLER,
MARGARET SORENSEN.